(12) United States Patent 
Yu et al.

(10) Patent No.: US 12,612,131 B2 
(45) Date of Patent: Apr. 28, 2026

(54) OUTPUT GEAR, WHEEL AND DRIVING DEVICE FOR ELECTRIC SCOOTER, AND AN ELECTRIC SCOOTER

(71) Applicant: Zhejiang Easy Vehicle Co., Ltd., Yongkang City (CN)

(72) Inventors: Longhua Yu, Yongkang City (CN); Xiunan Hou, Yongkang City (CN); Yong Zhang, Yongkang City (CN); Dan Li, Yongkang City (CN)

(73) Assignee: Zhejiang Easy Vehicle Co., Ltd., Yongkang City (CN)

( * ) Notice: Subject to any disclaimer, the term of this patent is extended or adjusted under 35 U.S.C. 154(b) by 454 days.

(21) Appl. No.: 18/298,926

(22) Filed: Apr. 11, 2023

(65) Prior Publication Data

US 2023/0331343 A1  Oct. 19, 2023

(30) Foreign Application Priority Data

Apr. 15, 2022  (CN) .......................... 202220902885.4

(51) Int. Cl.
| | |
|---|---|
| *B62M 11/02* | (2006.01) |
| *B60B 3/10* | (2006.01) |
| *B60B 35/12* | (2006.01) |
| *B62K 11/10* | (2006.01) |
| *B62M 7/12* | (2006.01) |
| *F16D 1/10* | (2006.01) |
| *F16H 55/17* | (2006.01) |

(52) U.S. Cl.
CPC .............. *B62M 11/02* (2013.01); *B60B 3/10* (2013.01); *B60B 35/122* (2013.01); *B62K 11/10* (2013.01); *B62M 7/12* (2013.01); *F16D* *1/101* (2013.01); *F16H 55/17* (2013.01); *B62K 2202/00* (2013.01); *F16D 2001/103* (2013.01)

(58) Field of Classification Search
CPC ...................................................... B62M 11/02
See application file for complete search history.

(56) References Cited

U.S. PATENT DOCUMENTS

| | | | | |
|---|---|---|---|---|
| 6,029,763 A | * | 2/2000 | Swisher .................... | F16H 1/16 |
| | | | | 180/65.6 |
| 2019/0367116 A1* | | 12/2019 | Desberg ................... | B62J 45/41 |

FOREIGN PATENT DOCUMENTS

| | | | | | |
|---|---|---|---|---|---|
| CN | 205769953 U | * | 12/2016 | ............. | B62K 3/002 |
| WO | WO-2020193585 A1 | * | 10/2020 | ........... | B62K 15/006 |

* cited by examiner

*Primary Examiner* — Vicky A Johnson

(57) ABSTRACT

The present invention relates to an output gear, a wheel and a driving device for an electric scooter, and to the electric scooter. The output gear for an electric scooter comprises a gear having teeth and tooth spaces, an external spline securely connected to the center of a gear face of the gear, wherein the external spline has external spline teeth and external spline tooth spaces, shaft holes are defined in centers of the gear and the external spline. The gear directly outputs torque after speed reduction to the wheel by means of a connection structure of the external spline and the internal spline, so that a final output is more stable, the problem in a conventional electric scooter that the rotation of the scooter's wheel is affected due to a clearance between the output shaft and the wheel is alleviated, the speed reduction precision and sensitivity are consequently improved.

8 Claims, 3 Drawing Sheets

OUTPUT GEAR, WHEEL AND DRIVING DEVICE FOR ELECTRIC SCOOTER, AND AN ELECTRIC SCOOTER

CROSS REFERENCE TO RELATED APPLICATIONS

This application claims priority to and benefits of Chinese Patent Application No. 202220902885.4 filed Apr. 15, 2022, which is incorporated by reference in its entirety.

TECHNICAL FIELD

The present invention relates to the field of speed reduction equipment, and in particular to an output gear, a wheel, a driving device for an electric scooter, and to the electric scooter.

BACKGROUND ART

Speed reducers are commonly used for low-speed large-torque transmission equipment, and achieve the purpose of reducing the speed of electric motors, internal combustion engines or other high-rotation-speed power machines by means of engagement between gears having a small number of teeth on input shafts of the speed reducers and large gears on output shafts. There are a great variety of speed reducers, which can be classified into deployable speed reducers, split speed reducers and coaxial speed reducers according to the types of transmission.

With the accelerating pace of people's life, a convenient and rapid vehicle, namely, an electric scooter, has gained more and more people's favor. The electric scooter, which is provided with an electric kit based on a traditional human-powered scooter, is convenient to carry and applied in a variety of occasions. In order to reduce rotation speed, increase output torque and reduce the inertia of the load during the running of the electric scooter, it is necessary to mount a speed reducer on the electric scooter to achieve a speed reduction function. Typically, when the electric scooter runs, the output shaft of the speed reducer directly drives wheels to rotate. Such a structure directly outputs torque by means of the output shaft, the output is not stable enough, it is likely to cause an error between the output shaft and the wheels due to wear, interference and other reasons, and the output rotation speed is consequently affected.

SUMMARY OF THE INVENTION

1. Problem to be Solved

In view of the problem in the prior art that when an electric scooter is running, the output of driving wheels to rotate by an output shaft is not stable enough, the present invention provides an output gear for an electric scooter, and a wheel for an electric scooter, where the output gear directly outputs torque by means of the wheel and drives the wheel to rotate, so that the electric scooter is stable and sensitive during running.

2. Technical Solution

In order to solve the above-mentioned problem, the technical solution adopted by the present invention is as follows:

An output gear for an electric scooter comprises a gear having a plurality of teeth and a plurality of tooth spaces, and an external spline securely connected to the center of a gear face of the gear, wherein the external spline comprises a plurality of external spline teeth and a plurality of external spline tooth spaces, and shaft holes are defined in centers of the gear and the external spline.

Preferably, a hollow-out slot is formed in the center of the external spline tooth, and the depth of the hollow-out slot is equal to a tooth width of the external spline tooth.

Preferably, a tooth thickness of the external spline tooth decreases as a distance to the central axis of the external spline decreases.

Preferably, the gear is an involute cylindrical gear.

A wheel for an electric scooter, which engages with the output gear for the electric scooter, comprises a wheel body and an internal spline, wherein the wheel body has a rim and spokes securely connected to the center of the rim, the internal spline is securely connected to the center of a wheel face of the wheel, the internal spline comprises a plurality of internal spline teeth and a plurality of internal spline tooth spaces, shaft holes are defined in the centers of the wheel body and the internal spline, and the internal spline and external spline are in fitting connection.

Preferably, a tooth thickness of the internal spline tooth decreases as a distance to the central axis of the internal spline decreases.

Preferably, the side of the internal spline tooth facing away from the central axis of the internal spline has grooves, and a width of the groove in a central axis direction of the internal spline is equal to the tooth width of the internal spline tooth.

A driving device for an electric scooter comprises the above-described wheel for an electric scooter, and a power mechanism for driving an output gear to rotate, wherein the external spline and the internal spline are plug-fitted with each other, the external spline teeth of the external spline are fitted with the internal spline tooth spaces of the internal spline, and the external spline tooth spaces of the external spline are fitted with the internal spline teeth of the internal spline. The output gear for the electric scooter and the wheel for the electric scooter rotate synchronously.

An electric scooter comprises the above-described driving device for an electric scooter, a front wheel provided corresponding to the wheel for an electric scooter, and a frame connecting the driving device for the electric scooter to the front wheel, wherein the rotation of the wheel in the driving device for the electric scooter drives the front wheel to rotate.

3. Beneficial Effects

Compared with the prior art, the present invention has the beneficial effects:

The gear directly outputs torque after speed reduction to the wheel by means of a connection structure of the external spline and the internal spline, so that a final output is more stable, the problem in a conventional electric scooter that the rotation of the scooter's wheel is affected due to a clearance between the output shaft and the wheel is alleviated, and the speed reduction precision and sensitivity are consequently improved.

1. Gear; 2. Tooth; 3. Tooth space; 4. External spline; 5. External spline tooth; 6. External spline tooth space; 7. Shaft hole;

8. Hollow-out slot; 9. Rim; 10. Spoke; 11. Tire; 12. Internal spline; 13. Internal spline tooth;

14. Internal spline tooth space; 15. Groove; 16. Power mechanism; 17. Front wheel; 18. Frame.

DETAILED DESCRIPTION OF EMBODIMENTS

In order to make the technical means, creative features, objects and effects achieved by the present invention easy to understand, the present invention will be further elaborated with embodiments below.

A conventional electric scooter is generally driven by a front wheel, and a speed reduction mechanism is provided at the front wheel, an output shaft is provided at an output end of the speed reduction mechanism, the output shaft is securely connected to a driving gear and the front wheel, and the driving gear is engaged with the output shaft, thereby achieving synchronous rotation of the output shaft and the front wheel. In this output mode, there is a clearance between the output shaft and the driving gear which drives the output shaft to rotate, and there is also a clearance between the output shaft and the front wheel, resulting in that the output is not stable enough. It is possible to cause an error between the output shaft and the wheel due to wear, interference and other reasons, affecting the final rotation speed of the wheel. To this end, the present invention provides an output gear for an electric scooter, a wheel for an electric scooter, a driving device for an electric scooter, and an electric scooter, wherein the output gear and the wheel are used in a matched manner, and by providing an external spline and an internal spline, torque is directly output by the output gear, avoiding an error caused by rotation of an output shaft.

Embodiment 1

Figure 1:
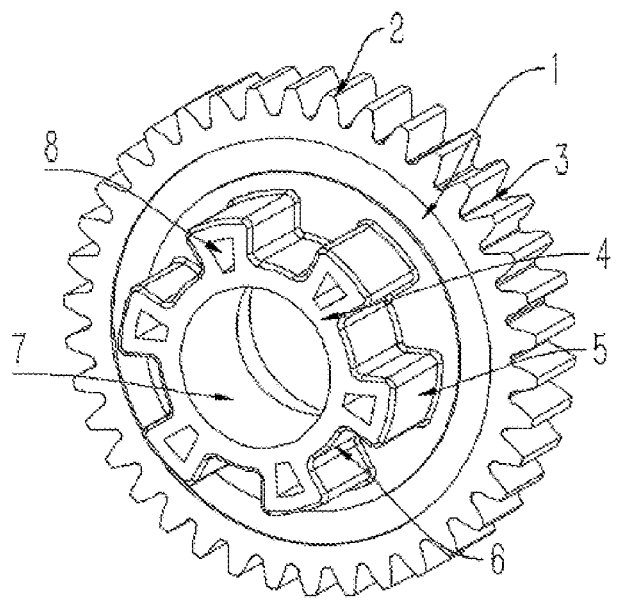
FIG. 1 is a perspective view of an output gear for an electric scooter of the present invention.

As shown in FIG. 1, an output gear for an electric scooter is mainly used in an output structure of the electric scooter. The output gear is mainly composed of a gear 1 and an external spline 4; by means of the connection of the external spline 4 and a driven structure, torque is output directly from the gear 1, and output stability is increased.

The gear 1 is an involute gear 1, preferably an involute cylindrical gear 1, and has a plurality of teeth 2, a plurality of tooth spaces 3, and opposite gear faces, wherein shaft holes 7 for connecting a shaft are defined in centers of the gear faces.

The external spline 4 may be made of a steel, iron or plastic material, preferably the plastic material, and is securely connected to the center of a gear face of the gear 1 in a connecting manner such as welding, screws, or bolts, and comprises a plurality of external spline teeth 5 and a plurality of external spline tooth spaces 6. A hollow-out slot 8 is provided in the center of the external spline tooth 5, and the depth of the hollow-out slot 8 is equal to a tooth width of the external spline tooth 5, that is, the hollow-out slot 8 extends from one side face to the other side face of the external spline 4. Thus, when the structure is machined by means of injection molding, a thickness of the material can be decreased so that the shrinkage or deformation possibility of the part after demolding is reduced; on the contrary, if the hollow-out slot 8 is not provided, a thickness of a portion required by the external spline tooth 5 will be too large, and a large deformation will occur in a cooling process after the injection molding, resulting in machining failure of the structure. In addition, a shaft hole 7 is also defined in the center of the external spline 4 and corresponds to the gear face, and is used to connect the shaft.

In another possible embodiment, on a side face of the external spline 4, circular arcs of different diameters have tooth thicknesses of different sizes of external spline teeth 5, wherein the tooth thicknesses of the external spline teeth 5 decrease as distances between the circular arcs of different diameters and the central axis of the external spline 4 are shortened, such that part of the circumferential lengths of addendum circle arcs described by tooth crests are greater than part of the circumferential lengths of dedendum circle arcs described by tooth roots. In this way, there is a greater contact area between a crest of the external spline tooth 5 and a space 3 of the internal spline tooth 13 by engaging the external spline 4 with the mating internal spline 12, improving connecting stabilization.

Embodiment 2

Figure 2:
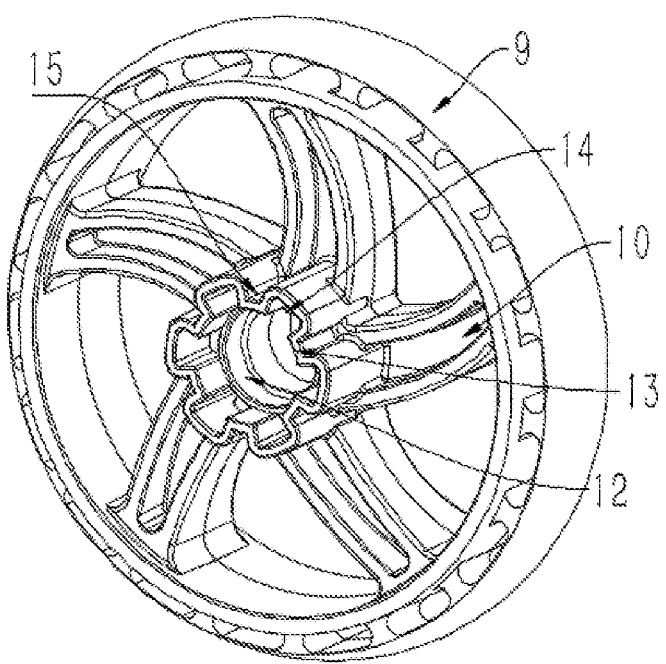
FIG. 2 is a perspective view of a wheel for an electric scooter of the present invention.
Figure 3:
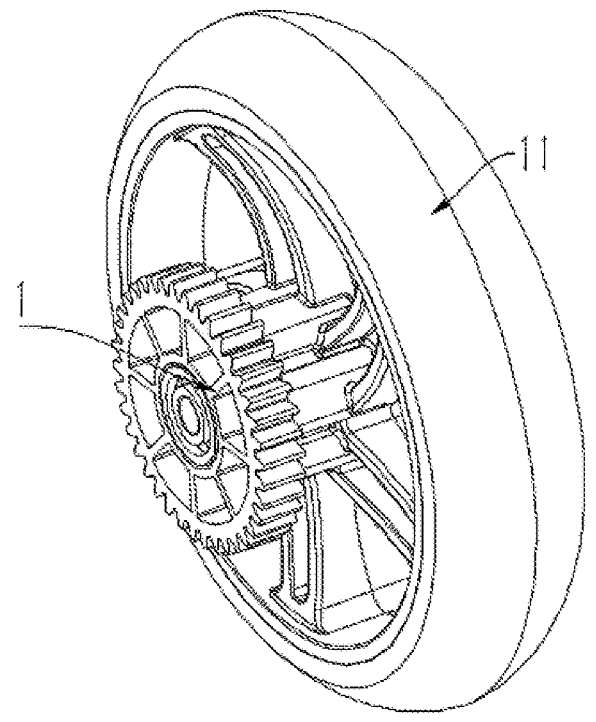
FIG. 3 is a perspective view showing connection between the gear and the wheel of the present invention.
Figure 4:
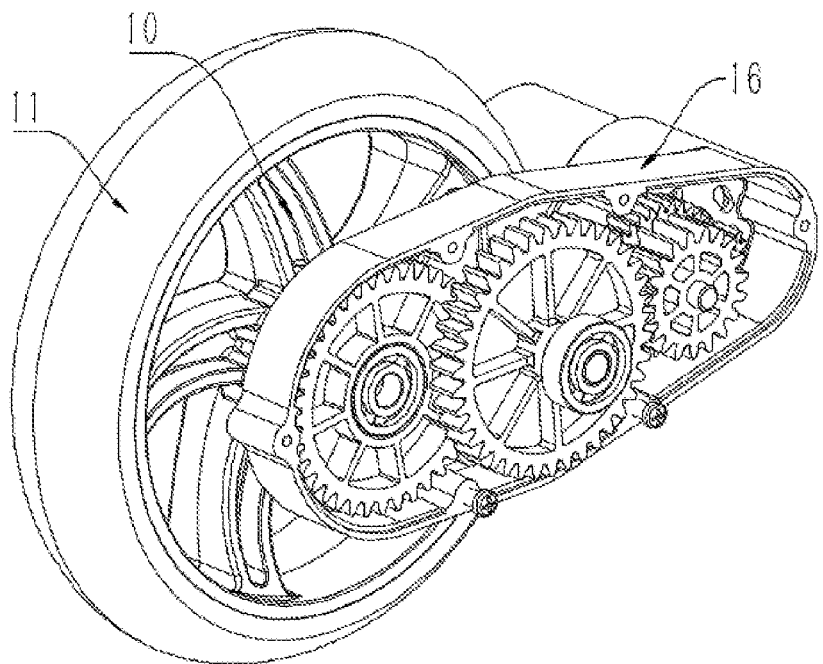
FIG. 4 is a perspective view of a driving device of the present invention.

As shown in FIG. 2, a wheel for an electric scooter is used in cooperation with an output gear for an electric scooter in Embodiment 1. The wheel for an electric scooter is mainly composed of a wheel body and an internal spline 12; by connecting the internal spline 12 to a driving structure, output torque is directly transferred from a driving gear 1 to the wheel body, thereby increasing output stability.

A main wheel body includes a rim 9 and spokes 10 securely connected to the center of the rim 9, and an outer ring of the rim 9 is further sleeved with a tire 11. A shaft hole 7 for connecting a shaft is further defined in a center of the spoke 10.

The internal spline 12 may be made of a steel, iron or plastic material, preferably the plastic material, and is securely connected to the center of a wheel face of the wheel in a connecting manner such as welding, screws, or bolts, and comprises a plurality of internal spline teeth 13 and a plurality of internal spline tooth spaces 14.

In another possible embodiment, on a side face of the internal spline 12, circular arcs of different diameters have tooth thicknesses of different sizes of internal spline teeth 13, wherein the tooth thicknesses of the internal spline teeth 13 decrease as distances between the circular arcs of different diameters and the central axis of the internal spline 12 decrease, such that part of the circumferential lengths of addendum circle arcs described by tooth crests are greater than part of the circumferential lengths of dedendum circle arcs described by tooth roots. In this way, there is a greater contact area between a crest of the internal spline tooth 5 and a space 3 of the internal spline tooth 13 by engaging the internal spline 12 with the mating internal spline 4, improving connecting stabilization.

In another possible embodiment, the side of the internal spline tooth 13 facing away from the central axis of the internal spline 12 has grooves 15, a width of the groove 15 in a central axis direction of the internal spline 12 is equal to the tooth width of the internal spline tooth 13, that is, the groove 15 extends from one side face to the other side face of the internal spline 12. Thus, when the structure is machined by means of injection molding, the thickness of the material can be decreased so that the shrinkage or deformation possibility of the part after demolding is reduced while the weight of the device is decreased.

Embodiment 3

As shown in FIGS. 1-4, a driving device for an electric scooter is mainly composed of a power mechanism 16, an output gear for an electric scooter in Embodiment 1, and a wheel for an electric scooter in Embodiment 2. The driving device can serve as a main constituent part of the electric scooter.

The power mechanism is connected to and drives the output gear to rotate, and the external spline 4 on the output gear and the internal spline 12 on the wheel are plug-fitted with each other, so that the external spline teeth 5 of the external spline 4 are fitted with the internal spline tooth spaces 14 of the internal spline 12, the external spline tooth spaces 6 of the external spline 4 are fitted with the internal spline teeth 13 of the internal spline 12, and finally, synchronous rotation of the output gear and the wheel is achieved.

This driving device avoids the mode that torque is directly output to the wheel by an output shaft, avoiding an error caused by a clearance between the output shaft and the gear 1 and the wheel, and improving the output stability.

Embodiment 4

Figure 5:
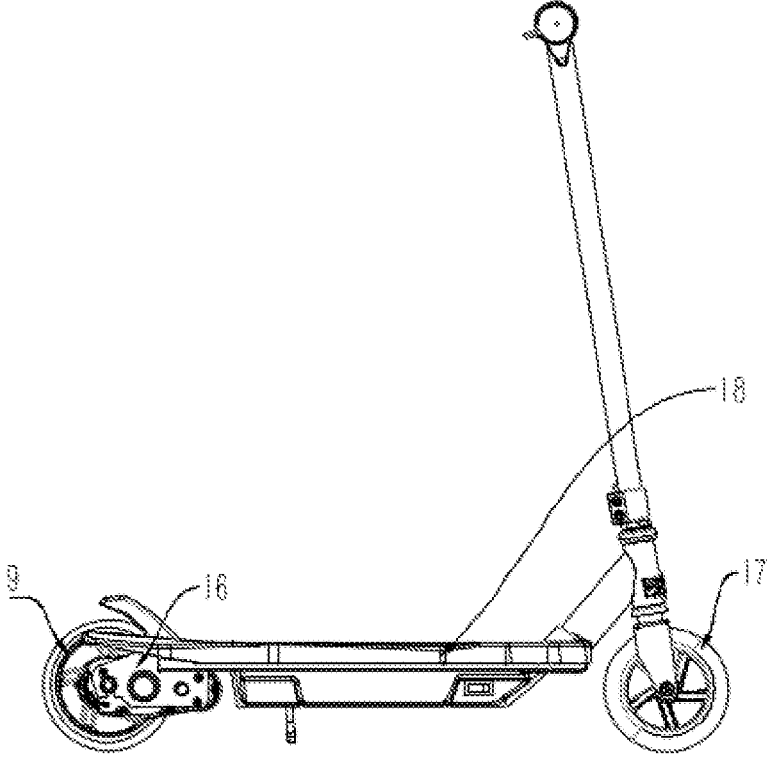
FIG. 5 is a perspective view of a wheel for an electric scooter of the present invention.

As shown in FIG. 5, an electric scooter mainly includes a driving device for an electric scooter in Embodiment 3, a front wheel 17 provided corresponding to the wheel, and a frame 18 connecting the driving device and the front wheel 17. A power source is mounted on the frame 18, and the rotation of the wheel in the driving device for an electric scooter drives the front wheel 17 to rotate.

In the description of the present patent, it should be understood that the orientations or the position relationships indicated by the terms such as "upper", "lower", "left", "right", "vertical", "horizontal", "top", "bottom", "inner", "outer", "front", "rear", "clockwise", or "counterclockwise" are based on the orientations or the position relationships shown in the accompanying drawings, which are only for ease of description of the present invention and for simplifying the description, rather than indicating or implying that the devices or elements referred to necessarily have a specific orientation, a specific orientation structure and operation, and therefore cannot be construed as limiting the present patent.

In the description of the present application, it should also be noted that the terms "mounting", "connecting", "connection" or "securing" should be interpreted in a broad sense, unless explicitly specified and defined otherwise, which, for example, may be a secured connection, a detachable connection or an integral connection, or may be a direct connection, or an indirect connection through an intermediate medium. For those of ordinary skill in the art, the specific meaning of the foregoing term in the present patent may be understood according to specific circumstances.

The above shows and describes the basic principles, main features and advantages of the present invention. A person in the art should understand that the present invention is not limited by the foregoing embodiments. The foregoing embodiments and the specification only describe the principles of the invention. Various changes and improvements of the invention can further be made without departing from the spirit and scope of the present invention, and these changes and improvements shall fall within the claimed protection scope of the present invention. The claimed protection scope of the present invention is defined by the append claims and their equivalents.

The invention claimed is:

1. An output gear for an electric scooter, comprising: a gear (1) having a plurality of teeth (2) and a plurality of tooth spaces (3), and an external spline (4) fixedly connected to a center of a gear face of the gear (1), wherein the external spline (4) comprises a plurality of external spline teeth (5) and a plurality of external spline tooth spaces (6), and shaft holes (7) are defined in centers of the gear (1) and the external spline (4), wherein a hollow-out slot (8) is formed in a center portion of the external spline tooth (5), and a depth of the hollow-out slot (8) is equal to a tooth width of the external spline tooth (5).

2. The output gear for an electric scooter according to claim 1, wherein a tooth thickness of the external spline tooth (5) decreases as a distance to a central axis of the external spline (4) decreases.

3. The output gear for an electric scooter according to claim 1, wherein the gear (1) is an involute cylindrical gear.

4. A wheel for an electric scooter, engaging with the output gear according to claim 1, comprising: a wheel body and an internal spline (12), wherein the wheel body comprises a rim (9) and spokes (10) securely connected to a center portion of the rim (9), the internal spline (12) is securely connected to a center of a wheel face of the wheel, the internal spline (12) comprises a plurality of internal spline teeth (13) and a plurality of internal spline tooth spaces (14), shaft holes are defined in the wheel body and the internal spline (12), and the internal spline (12) is engaged with the external spline (4).

5. The wheel for an electric scooter according to claim 4, wherein a tooth thickness of the internal spline tooth (13) decreases as a distance to a central axis of the internal spline (12) decreases.

6. The wheel for an electric scooter according to claim 5, wherein the side of the internal spline tooth (13) facing away from the central axis of the internal spline (12) has grooves (15), and a width of each of the grooves (15) in a central axis direction of the internal spline (12) is equal to a tooth width of the internal spline tooth (13).

7. A driving device for an electric scooter, comprising the according to claim 4, and a power mechanism (16) for driving the output gear to rotate, wherein the external spline (4) and the internal spline (12) are plug-fitted with each other, the plurality of external spline teeth (5) of the external spline (4) are fitted with the internal spline tooth spaces (14) of the internal spline (12), the external spline tooth spaces (6) of the external spline (4) are fitted with the plurality of internal spline teeth (13) of the internal spline (12), and the output gear for the electric scooter and the wheel for the electric scooter rotate synchronously.

8. An electric scooter, comprising the driving device according to claim 7, a front wheel (17) provided corresponding to the wheel for the electric scooter, and a frame (18) connecting the driving device for the electric scooter to the front wheel (17), wherein the rotation of the wheel in the driving device for the electric scooter drives the front wheel (17) to rotate.

* * * * *